Dec. 22, 1942.    J. W. LEIGHTON    2,305,881
OSCILLATORY CONNECTION
Filed Feb. 2, 1942
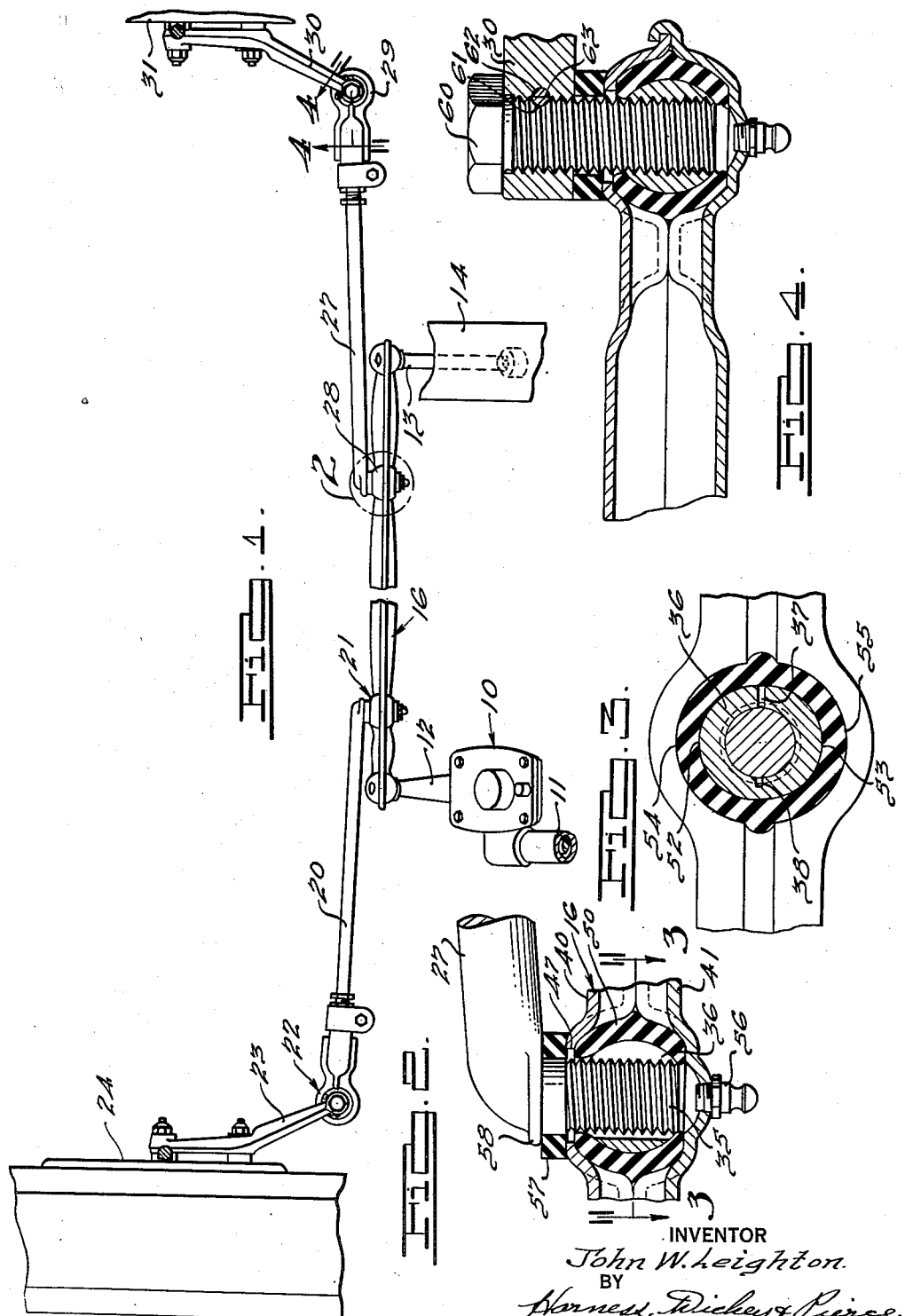
INVENTOR
John W. Leighton.
BY
Harness, Dickey & Pierce.
ATTORNEYS.

Patented Dec. 22, 1942

2,305,881

UNITED STATES PATENT OFFICE 2,305,881

OSCILLATORY CONNECTION

John W. Leighton, Port Huron, Mich.

Application February 2, 1942, Serial No. 429,179

3 Claims. (Cl. 287—85)

This invention relates generally to automobiles and it has particular relation to oscillatory connections adapted to connect oscillatory parts in a steering gear. In certain respects, the invention constitutes an improvement over that embodied in my copending application for patent, Serial No. 377,169, filed February 3, 1941.

One object of the present invention is to provide a further improved steering gear and connections therein for permitting different oscillatory movements required.

Another object of the invention is to provide an improved oscillatory connection for steering gears or the like including a threaded bearing and improved means for preventing one of the parts from turning during oscillatory movements.

Other objects of the invention will become apparent from the following specification, from the drawing relating thereto, and from the claims hereinafter set forth.

For a better understanding of the invention, reference may be had to the drawing, wherein:

Figure 1 is a plan view of a steering gear embodying one form of the invention;

Fig. 2 is a cross-sectional view on a larger scale taken substantially along a horizontal plane indicated at 2—2 in Fig. 1;

Fig. 3 is a cross-sectional view taken substantially along the line 3—3 of Fig. 2;

Fig. 4 is a cross-sectional view on a larger scale taken substantially along the line 4—4 of Fig. 1.

Referring to Fig. 1, the steering mechanism is indicated generally at 10 and includes a turnable post or shaft 11 which is operated by moving the steering wheel and operation of this, in turn, moves a crank arm 12. The box or mechanism 10 is mounted on the frame of the vehicle so that the crank arm 12 projects downwardly and forwardly and at the laterally opposite side of the center line of the vehicle, a second crank arm 13 depends from a frame member 14. A link 16 is movably connected at its ends to the forward ends of the arms 12 and 13 so that when the crank arm 12 is moved, the link 16 will be shifted laterally through parallel positions.

A tie rod 20 is pivotally connected to the link 16 at a point adjacent the crank arm 12 as indicated at 21 and at its opposite end the tie rod is connected as indicated at 22 to an arm 23 rigid with the wheel 24. Similarly, a tie rod 27 is pivotally connected as indicated at 28 to the link 16 adjacent the arm 13 and this tie rod in turn at its other end is pivotally connected as indicated at 29 to an arm 30 on the right wheel indicated at 31.

Referring to Fig. 2, the tie rod 27 terminates in a threaded trunnion 35 which projects into and has threaded bearing engagement with a bushing 36 having a generally ball shaped exterior surface. This bushing is longitudinally split at one point as indicated at 37 in Fig. 3 and diametrically opposite to the split, the wall has an axially extending groove 38 so that the wall of the bushing opposite the split is thinner than it is at other points. The split permits contraction of the bushing about the trunnion and the groove 38 reduces resistance to contraction since the wall of the bushing at the location of the groove serves as a hinge point.

As best shown by Fig. 2, the link 16 is formed from sheet metal stampings indicated at 40 and 41, and, as brought out in detail in the copending application for patent mentioned, the two stampings are positively connected together by means of folded over, interlocking edges. The trunnion 35 projects into the stamping 40 through a slightly larger opening 47 and at the point where the trunnion enters the stamping, both stampings are shaped to provide a substantially ball shaped socket. This socket is substantially larger than the bushing 36 and between the bushing and the interior wall of the socket, a resilient rubber bushing 50 is provided. Preferably, this bushing is constructed of synthetic rubber such as neoprene and has oil or lubricant resisting qualities. The stampings are so interlocked during assembly that the rubber is placed under compression, from which it follows that the rubber constantly acts to contract the bushing about the trunnion. Hence, any looseness is taken up by contraction of the bushing, and as wear on the thread occurs, the bushing gradually contracts to compensate for the wear. The rubber not only provides a cushion to counteract vibration and a means for contracting the bushing about the trunnion, but it also serves to permit a certain amount of movement of the trunnion and link relatively in directions longitudinally and transversely of the link. Pivotal movement of the trunnion and bushing is permitted by the threaded bearing and it will be understood that the contracting tendency of the bushing is not such as to prevent a free and easy oscillatory movement between the bushing and the trunnion.

Generally, the foregoing structure is embodied in the copending patent application mentioned. The present improvement mainly comprises making the ball shaped bushing 36 slightly oval in a direction transversely to the trunnion axis, and, as illustrated in Fig. 3, the high sides of the bushing are provided at the points 52 and 53, while the low points are located on a line 90° from the high points. In other words, the larger diameter terminates at the points 52 and 53 while the smaller diameter is directed at right angles to the larger diameter. Similarly, the socket formed by the stampings has an oval shape with its larger diameter terminating at the points 54 and 55 and its smaller diameter directed at right angles to the larger diameter. Thus, between the bushing and the socket wall, an oval shaped space is provided for the rubber and it follows that the rubber will correspond to this shape. With this arrangement, the ball shaped bushing is more positively prevented from turning about the axis of the threaded bearing and, accordingly, during oscillatory movements about the threaded bearing, the bushing has less tendency to turn and is more positively held in its normal position. This slight oval character of the parts does not, however, prevent other movements required during operation of the steering gear since the rubber will allow the necessary deformation. Longitudinally of the threaded bearing, the bushing and socket need not be oval and the curvature of longitudinal cross-sections may generally be the same. The principal improvement is to provide the oval shape transversely of the axis of the threaded bearing.

Lubricant may be injected into the threaded bearing by means of a grease fitting 56 and if found desirable a central opening may be provided in the trunnion and this opening may interconnect with radial openings leading to the threads. A rubber sealing ring 57 may be employed around the base of the trunnion in sealing engagement with the outer surface of the stamping 40 and this sealing ring may be retained by a collar 58 on the tie rod 27.

Each of the tie rods 20 and 27 is connected to the link 16 in the manner shown by Figs. 2 and 3 and substantially similar oscillatory connections may be provided at the ends of the wheel arms 23 and 30. The connection between the wheel arm 30 and the tie rod 27 is generally shown in Fig. 4 and this structure may differ slightly from that already described in that a threaded bolt 60 is threaded through an opening in the arm 30 for the purpose of providing the threaded trunnion. The bolt and the arm have corresponding grooves 61 and 62 and a cotter pin 63 may be inserted in the grooves for the purpose of locking the bolt in place. Otherwise, the structure of the oscillatory connection is like that already described. With respect to detailed construction of the tie rods 20 and 27 and other details which need not be specifically mentioned here, reference may be had to the copending application.

In connection with the stampings, it is to be understood that the two sheets of metal are formed to provide partial sockets and that the parts are brought together so that a completely annular socket is obtained. In assembling the parts, the ball may be placed within the rubber bushing and then the stampings may be brought together, and it is to be understood that the arrangement and dimensions of parts are such that the rubber will be placed in a state of compression sufficient for the purpose of constantly tending to contract the bushing. The trunnion then may be threaded into the bushing. It would also be feasible to insert the trunnion into the stamping 40 and then thread the bushing thereon before applying the stamping 41.

Although only one form of the invention has been illustrated and described in detail, it will be apparent to those skilled in the art that various modifications may be made without departing from the spirit of the invention.

What is claimed is:

1. An oscillatory connection for automobiles comprising an outer member having a socket, an inner member projecting into the socket and having a threaded portion, an internally threaded bushing in the socket and having pivotal threaded bearing engagement with the inner member, and resilient rubber in the socket and around the bushing, said bushing being axially slotted and contractible and having its outer surface of non-circular shape relative to the axis of the threaded bearing so as to resist turning thereof in the surrounding rubber when the inner member turns about said axis.

2. An oscillatory connection for automobiles comprising an outer member having a socket, an inner member projecting into the socket and having a threaded portion, an internally threaded bushing in the socket and having pivotal threaded bearing engagement with the inner member, and resilient rubber in the socket and around the bushing, said bushing being axially slotted and having its outer surface substantially ball shape but oval in a direction transverse to the axis of the threaded bearing.

3. An oscillatory connection for automobiles comprising an outer member having a socket, an inner member projecting into the socket and having a threaded portion, an internally threaded bushing in the socket and having pivotal threaded bearing engagement with the inner member, and resilient rubber in the socket and around the bushing, said bushing, rubber, and socket having substantially ball shape interfitting surfaces which are oval transversely to the bearing axis, the bushing also being slotted longitudinally so as to be contractible on the threaded inner member.

JOHN W. LEIGHTON.